Jan. 28, 1964  A. G. NERHEIM  3,119,252
SAMPLE INTRODUCTION SYSTEM FOR GAS CHROMATOGRAPHY APPARATUS
Filed Aug. 10, 1960
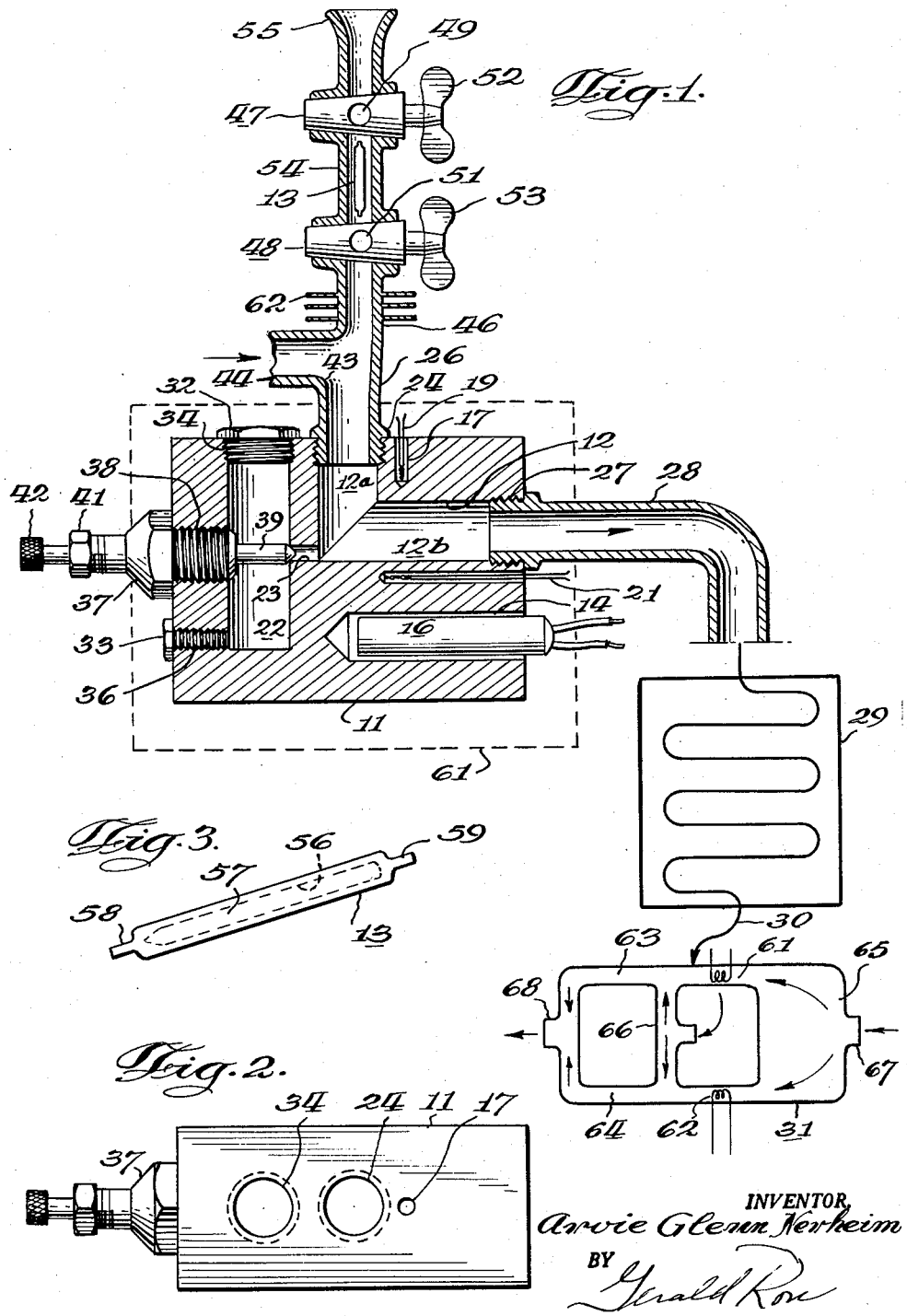
INVENTOR.
Arvie Glenn Nerheim
BY
Gerald Row
Attorney.

United States Patent Office 3,119,252
Patented Jan. 28, 1964

3,119,252
SAMPLE INTRODUCTION SYSTEM FOR GAS
CHROMATOGRAPHY APPARATUS
Arvie Glenn Nerheim, Crown Point, Ind., assignor to
Standard Oil Company, Chicago, Ill., a corporation of
Indiana
Filed Aug. 10, 1960, Ser. No. 48,768
5 Claims. (Cl. 73—23)

This invention relates to an improved system for introducing small amounts of volatile fluid samples into a gas chromatography apparatus. More particularly, it provides a system for introducing such samples in a particularly convenient manner.

This application is a continuation-in-part of my application S.N. 827,042 filed July 14, 1959, now Patent No. 3,063,286 granted November 13, 1962.

Gas chromatography, a recently developed technique for separation and analysis of complex mixtures of volatile materials, is a technique wherein components of such mixtures are separated by selective partition between a stationary liquid phase and a moving gas phase. Separations take place in long columns containing a thin film of the stationary liquid phase, or "substrate," disposed either on the column's inner walls or on inert high surface area solids such as crushed firebrick. Components of a volatile sample mixture are separated as they are carried through the column by a moving carrier gas phase, called the "eluting gas," and the components are detected in the eluted gas as they exit from the column.

Gas chromatography separations are possible by reason of different components in the sample being more or less soluble than other components in the liquid substrate. Thus, the least soluble component tends to remain preferably in the gas phase and is swept through the column at a velocity approaching that of the eluting gas. More soluble components, however, will pass through the column at lower rates because the process of dissolving in and expelling from the stationary liquid phase takes additional time. Because of differences in partition, the several components of the original sample emerge from the column in the eluted gas at different times and thus are separated.

Suitable detectors are positioned downstream of the chromatographic column. These are sensitive to the composition of the eluted gas, and generally are adapted to determine the composition and express the result as a chromatogram comprising a series of peaks on a moving strip chart. The location of each peak is a characteristic of that particular component in the sample, while the integrated peak area is a measure of the absolute amount of that component in the eluted gas.

In my parent application S.N. 827,042 (now U.S. Patent No. 3,063,286) I described a system for introducing very small amounts of sample, of the order of 20 microliters down to as little as 0.02 microliter, into gas chromatography devices. This system involves encapsulating such samples in a sealed tube made of a metal that fuses at a relatively low temperature. An encapsulated sample is introduced by way of a suitable air lock into the eluting gas stream entering a gas chromatography column and is heated so as to melt the tube and liberate the volatile sample as a unitary "slug." This technique offers numerous advantages, and in particular permits an accurately known quantity of sample to be employed. When a component detector which is sensitive to gas densities is employed to analyze the eluted gas, my technique permits analyses to be made without requiring the use of "internal standards," i.e., pure compounds which are added in precisely known amounts to the sample before analysis and which record their presence as a distinct peak of measurable area on the chomatogram.

It is a major object of the present invention to provide an improved apparatus for introducing encapsulated samples into a gas chromatography apparatus. Another object is to provide a sample introduction device which features simple construction and convenient operation. A further object is to provide such device in an embodiment which is suitable for permanent and trouble-free installation. Other and more particular objects will become apparent as the description of this invention proceeds.

In accordance with the invention, I provide a sample introduction device wherein the encapsulated sample is heated in a melt zone comprised of a block of heat-conducting metal such as brass or stainless steel. This block is equipped with a conduit for passing carrier gas through it, with an air lock for introducing the encapsulated sample into the conduit, and with a valved drain for withdrawing melted metal from the conduit. In addition, the block may have an electrical heater which is advantageously embedded in the block itself for convenient temperature control. In a further embodiment, the temperature-conducting block has a reservoir for accumulating or collecting melted metal from several samples so that the block may be used repeatedly without requiring either frequent disassembly or cleaning.

The invention will be further described in the ensuing specification which is to be read in conjunction with the attached drawings wherein:

FIGURE 1 is a sectional elevation showing the preferred embodiment of this invention in combination with a chromatography column and a particular type of detector operating on gas density balance principles;

FIGURE 2 shows a partial top view of the embodiment depicted in FIGURE 1; and

FIGURE 3 is an enlarged elevation of a sample-containing fusible metal capsule.

Turning first to FIGURE 1, the figure shows in sectional elevation the inventive device for introducing encapsulated volatile samples into a conduit 12 containing eluting gas passing through temperature conducting metal block 11.

The sample is initially confined within capsule 13 (shown in enlarged view in FIGURE 3) made of a low melting metal such as indium or the like. The length, outer diameter, and bore diameter of capsule 13 may be of any desired size sufficient to provide sufficient sample for analysis. Suitable capsule dimensions include an outside diameter of, say, about 0.040 inch and an inside diameter of about 0.010 inch, with a length of about one-half inch.

Metals employed for capsule 13 may be selected from a wide variety of elements and alloys which have a melting point below that at which the sample begins to decompose to an extent which inteferes with the subsequent analysis, and this of course depends largely on the nature of the particular sample. Low melting metals should be relatively soft so that the capsule can be sealed by pinching or the like, they should be malleable so that they may be easily drawn into tubing, and they should have a low vapor pressure. Also, to facilitate cold welding, the metal should not oxidize too readily in air at room temperature, and should not react with the sample when molten. The metal indium, either alone or in the form of alloys such as indium tin eutectic, are suitable for most purposes, since indium melts at about 155° C. and possesses virtually all of the desired attributes indicated above. Other metals may be alternatively employed, and in this connection attention is invited to the compilation in "Liquid Metal Handbook," by Richard N. Lyon, published by the Atomic Energy Commission and the Department of the Navy, Second Edition (revised) January 1954, especially Chapters II and III.

The block 11 itself is suitably a single block of a metal which has a relatively high heat transfer rate such as brass or a stainless steel. Several conduits and bores are drilled therein to provide a conduit 12 for the eluting gas, a hole 14 to accommodate electrical bayonet heater 16, one or more holes 17 and 18 to receive thermocouples 19 and 21, respectively, and a molten-metal collecting chamber 22.

Eluting gas conduit 12 is preferably drilled in two directions, one being vertical 12a and the other 12b being horizontal or inclined downward toward port 23. The vertical portion 12a is threaded at its inlet end 24 to receive inlet conduit 26 while the outlet end of conduit 12 is threaded at its outlet 27 to receive an outlet conduit 28 leading to chromatography column 29 and detector 31.

Chamber 22 may be drilled vertically downward into block 11 and provided with a top plug 32 and bottom drain plug 33, each respectively received in tapped holes 34 and 36.

Port 23 communicates between conduit 12 and chamber 22 and is adapted to permit molten metal from capsule 13 to drain from conduit 12 into the chamber after a capsule has been melted. To seal port 23 a needle valve 37 is threaded into tapped hole 38 in block 11, with its needle plug 39 being adapted to close port 23 when the plug is extended. Valve 37 may be obtained by removing and discarding the body from a conventional needle valve, and is equipped with a suitable packing gland 41 and with a knurled portion 42 for convenient rotation of plug 39.

A suitable air lock means is also provided, and since this air lock should be at a low temperature relative to that of block 11, is advantageously external of block 11. Thus, as shown in FIGURE 1, the air lock includes a T 43, with carrier or eluting gas being admitted through the T portion 44 and passing into conduit 12 via inlet conduit 26. The upper portion 46 which is in approximate vertical alignment with inlet conduit 26 extends upward and is provided with a pair of plug valves 47 and 48 equipped with ports 49 and 51 respectively and with handles 52 and 53 respectively. The spool piece 54 between valves 47 and 48 is of sufficient length and diameter to receive capsule 13 without admitting a surfeit of air. A funnel-like portion 55 superimposed above valve 47 affords convenient introduction of capsule 13 into the zone defined by spool piece 54.

Block 11 may be insulated by covering or encasing it with a suitable thickness of insulation material 61. To maintain the air lock at a lower temperature, conduit 46 may be provided with air-cooling fins 62.

Turning to FIGURE 2, a partial top view of the sample introduction apparatus is shown. Block 11 is provided with tapped holes 24 and 34 to receive inlet conduit 26 and plug 32 respectively, and with a small diameter hole 17 to receive a thermocouple (19 in FIGURE 1). All three holes may be in alignment with valve 37.

In FIGURE 3 an enlarged view of capsule 13 is shown. As indicated earlier this may be of indium or other low melting point metal drawn into tube form with a capillary bore 56 serving to contain a known volume of sample 57. Capsule 13 may be crimped at ends 58 and 59, the crimps being spaced at remote distances apart.

Reverting to FIGURE 1, operation of the inventive system is initially effected by passing a carrier or eluting gas through conduit 44 and into conduit 12 of block 11, and thence via outlet conduit 28 to the gas chromatography column 29 and detector 31.

With valve 47 in an open position and with valve 48 closed as shown, capsule 13 is introduced via funnel portion 55 into spool piece 54. Valve 47 is then closed, thus isolating spool piece 54 and capsule 13 from the atmosphere. When it is desired to admit the sample, valve 48 is opened thus permitting capsule 13 to descend by gravity through conduit 46 and inlet conduit 26 into carrier-gas transmitting conduit 12 in block 11. By means of the heat in a melt zone defined by conduit 12, capsule 13 is rapidly melted and liberates its contained sample almost instantaneously, the sample thereupon volatilizing and passing with the carrier gas through outlet conduit 28.

Suitably although not necessarily, after each sample introduction needle valve 39 is opened by turning handle 42, thus permitting molten metal to drain via drain conduit 23 into molten metal collecting chamber 22. Immediately thereafter valve 39 may be closed. The size of chamber 22 is sufficient to permit a large number of molten capsules to be contained therein, and after the capacity of chamber 22 is attained, the chamber 22 itself may be drained by removing threaded drain plug 33. Alternatively, a valve may be substituted for drain plug 33.

Meanwhile, the volatilized sample is appearing as a compacted "slug" in the carrier gas stream passing through conduit 28 to gas chromatography column 29. In column 29 the several components of the sample are resolved into "bands" and passed through conduit 30 to a detector 31 for analysis.

Detector 31 may be any of the detectors available to the art which are sensitive to composition differences in the eluted gas passing from chromatography column 29 via line 30. However it is highly advantageous to employ a detector which is sensitive only to differences in gas density, as detectors of this type combine with encapsulated samples of known volume or weight to enable chromatographic analysis without employing internal standards and without necessitating a complete and often arduous analysis of the entire sample.

The preferred detector 31 is a gas density balance of the type recently developed by me and shown in outline form in FIGURE 1. The balance employs twin temperature-sensitive resistant elements 61 and 62, which may be hot tungsten wire filaments or thermistor detectors arranged in vertically displaced channels 63 and 64 respectively. A stream of reference gas (which preferably has the same composition as the carrier gas admitted through conduit 44) passes into manifold chamber 65 and thence through conduits 63 and 64, in the meantime passing over elements 61 and 62. When the eluted gas stream enters detector 31 via line 30, it passes into a substantially vertical sample conduit 66 which is in communication with conduits 63 and 64. The eluted gas splits in sample conduit 66, with roughly one-half ascending and one-half descending. Should the eluted sample gas density momentarily exceed that of the reference gas entering manifold 65 via port 67, then more of the sample gas will tend to flow downward in conduit 66. As a result, the original flow of reference gas through conduits 63 and 64 will be disrupted somewhat, and accordingly the flow over element 61 will increase and that over element 62 will decrease. This cools the former while permitting the latter to increase in temperature (because of lowered dissipation of heat), causing an imbalance in an electrical bridge circuit which includes the filament detectors 61 and 62. The resulting electrical measurement will be directly proportional to the weight concentration of sample components in the total sample.

After analysis, reference and sample gases leave detector 31 through flow restrictive outlet conduit 68 and may be exhausted to the atmosphere.

Thus it is apparent that I have satisfied the objects of my invention and have provided a simple, rugged and foolproof apparatus for introducing encapsulated samples into a gas chromatography apparatus. The amount of sample may thus be held constant from run to run, and the sample may be conveniently transported and introduced without contamination.

While the invention in its various aspects has been described with reference to a particular embodiment thereof, it is apparent that this is by way of illustration only. Accordingly, it will be understood that modifications, alternatives, and variations will be apparent to those skilled in the art, and it is intended to embrace all such modifica-

I claim:

1. In a sample introduction system for gas chromatography wherein a small sample encapsulated in a metal tube composed of fusible metal is introduced via air lock means into a heated melt zone through which passes chromatographic carrier gas and wherein said fusible metal tube is melted in said zone thereby releasing said sample into the carrier gas, the improvement comprising a melt zone comprised of a block of temperature-conducting metal, said block having a carrier-gas transmitting conduit therethrough, valved drain means communicating with said conduit and adapted for withdrawing melted fusible metal from said conduit, and electrical heater means for said block.

2. In a sample introduction system for gas chromatography wherein a small sample encapsulated in a metal tube composed of fusible metal is introduced via air lock means into a heated melt zone through which passes chromatographic carrier gas and wherein said fusible metal tube is melted in said zone thereby releasing said sample into the carrier gas, the improvement comprising a melt zone comprised of a block of temperature-conducting metal, said block having a carrier-gas transmitting conduit therethrough, said block also having a melted-metal collecting chamber therein, valved drain means for transferring melted fusible metal from said conduit to said collecting chamber, drain means for withdrawing melted metal from said collecting chamber, and electrical heater means embedded in said temperature-conducting metal block.

3. An apparatus for introducing small volatile samples encapsulated in a fusible metal tube into a chromatographic carrier gas stream which comprises: a temperature-conducting metal melt zone, said melt zone having a conduit for passing said chromatographic carrier gas therethrough, valved drain means communicating with a lower portion of said conduit and adapted for withdrawing melted fusible metal therefrom, and electrical heater means embedded in said melt zone and adapted to melt said fusible metal tube and release said volatile sample into the chromatographic carrier gas stream.

4. An apparatus for introducing a volatile sample encapsulated in a fusible metal tube into a chromatographic carrier gas stream which comprises: a block of temperature-conducting metal, said block having a carrier-gas transmitting conduit therethrough, said block also having a melted-metal collecting chamber therein; valved drain means for transferring melted fusible metal from said carrier-gas transmitting conduit into said melted-metal collecting chamber; drain means for said melted-metal collecting chamber; electrical heater means for said block; inlet and outlet conduits communicating with said carrier-gas transmitting conduit; and air lock means communicating with said inlet conduit and adapted for inserting a sample-containing capsule and thereafter releasing said capsule into said inlet conduit and thence into said carrier-gas transmitting conduit for melting.

5. Apparatus of claim 4 wherein said air lock means comprise an elongated tube-receiving chamber, and plug valves at the ends of said chamber.

References Cited in the file of this patent

Article in Journal of Chromatography, vol. 4, No. 1, July 1960, pages 1–5, by Dubsky and Janak.